Oct. 30, 1962 F. H. BARNETT 3,061,120
PARKING SYSTEM
Filed March 22, 1960 4 Sheets-Sheet 1

INVENTOR.
Forest H. Barnett
BY
Robinson & Berry
ATTORNEYS

Oct. 30, 1962 F. H. BARNETT 3,061,120
PARKING SYSTEM
Filed March 22, 1960 4 Sheets-Sheet 2

INVENTOR.
Forest H. Barnett
BY
*Robinson & Berry*
ATTORNEYS

Oct. 30, 1962     F. H. BARNETT     3,061,120

PARKING SYSTEM

Filed March 22, 1960     4 Sheets-Sheet 3

INVENTOR.
Forest H. Barnett
BY
Robinson & Berry
ATTORNEYS

Oct. 30, 1962   F. H. BARNETT   3,061,120
PARKING SYSTEM
Filed March 22, 1960   4 Sheets-Sheet 4

INVENTOR.
Forest H. Barnett
BY
Robinson & Berry
ATTORNEYS

United States Patent Office 3,061,120
Patented Oct. 30, 1962

3,061,120
PARKING SYSTEM
Forest H. Barnett, 7702 N. 10th St., Tacoma 66, Wash.
Filed Mar. 22, 1960, Ser. No. 16,792
3 Claims. (Cl. 214—16.1)

This invention relates to what may be designated as an automobile parking and storage system. More particularly, it has reference to a means or mechanism for the direct conveyance of automobiles to and from a place of storage, as for example, between a street and designated car port in a parking or storage structure. A more specific description of the presently described system would be to define it as comprising a combination of storage structure and an elevator whereby automobiles, or the like, may be lifted from a city street, or loading level, for parking or storage into a selected port of an over-sidewalk storage structure, and whereby they may be transferred from the car port onto the elevator and lowered to street level for delivery to the vehicle driver.

It is the principal object of the present invention to provide a system of the above stated character including an over-sidewalk structure provided with individual car ports or car storage spaces; an elevator that is movable between a street level or loading position and an elevated position and onto which elevator an automobile can be driven from street level, then elevated to a selected upper level, and moved if desired along the over-sidewalk structure for transfer directly from the elevator into a designated storage space or car port at the selected floor level.

Another object of the present invention resides in the provision and use of slidable panels in conjunction with the elevator mechanism onto which automobiles may be driven for transfer to storage, and which panels are powered for movement between elevator and car port in order to eliminate any requirement for driving of the automobiles, while being parked from the elevator, into or from the car storage ports.

A further object of the present invention resides in the provision of a novel form of turntable mechanism on the elevator whereby automobiles, driven onto the elevator, parallel with the street direction and storage structure can be turned through a right angle and moved endwise by their transfer panel into the selected parking port of the storage structure.

Yet another object of the invention resides in the provision of novel channeled guides for the elevator; for stabilizing its movements in travel both vertically and horizontally and to provide easier and safer maneuvering of the elevator in its car parking movements.

Still further objects and advantages of the invention reside in the details of construction and combination of parts and mode of use of the transfer panels in combination with the elevator and on which the automobiles are moved to and from storage and in the specific means or mechanism whereby the movement of an automobile supporting panel from the elevator into its storage port causes a similar panel to be moved from the port into position on the elevator.

In accomplishing the above mentioned and other objects and advantages of the invention, I have provided the improved details of construction, the preferred forms of which are illustrated in the accompanying drawings, wherein.

Figure 1:
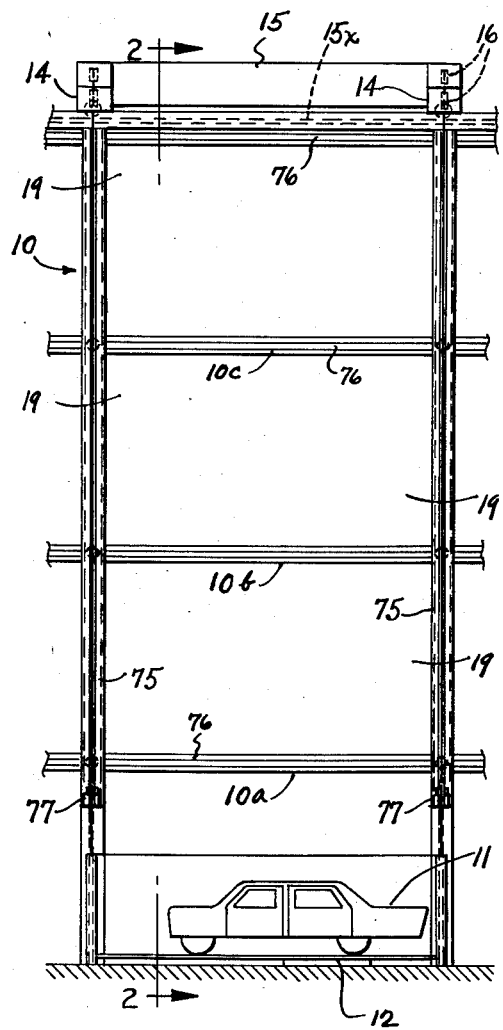
FIG. 1 is the street side elevation of one section of an automobile parking and storage structure comprised in the system embodied by the present invention.

Before giving a detailed description of the present system, it will be explained that this invention is also applicable for use in garages where an aisle is provided at a low or loading level for entering and departing vehicles and wherein a storage structure corresponding to the disclosed over-sidewalk structure of FIG. 1 is provided along one or both sides of the aisle. Therefore, it is the intent that this invention should not be confined to over-sidewalk parking, but shall be considered to equally apply to garages or storage structures where the same mode of operation as herein illustrated is employed.

In the following description, all vehicles which are of a character suitable for parking or moving by the present means will be referred to as "cars" and the individual storage spaces in which a car is to be disposed for storage will be designated as a "port." This is merely to simplify the description that follows.

Referring more in detail to the drawings:

In FIG. 1, I have shown a street side elevation of one section of multiple story over-sidewalk storage structure 10 and have shown a car 11 as positioned on the elevator platform 12 at street or loading level. The elevator 12 is seen to be suspended at opposite ends by cables 13 which are attached thereto at its four corners and which extend directly upwardly therefrom to the outreaching booms 14—14 of a horizontally traveling crane structure 15; these cables passing over guide sheave wheels 16 in the booms to cable winding drums designated at 17 mounted on the crane; these drums being driven by a suitable electric motor 18 under push button or any other satisfactory system of control, not shown.

Suitable tracks 15x support the crane for travel along the top of the building parallel with its front wall. Travel is effected by suitable driving connections with the motor 18.

It is to be observed that the storage structure 10 has vertically spaced, horizontal floors designated, respectively at 10a, 10b, and 10c, and that the spaces between floors may be divided by vertical columns or otherwise to define the individual car storage ports 19, each being herein shown to be of such proportionate dimensions as to contain two cars endwise therein.

The car parking operation, as will presently be more fully explained, anticipates that a car 11 to be parked or stored will be driven onto the elevator at street level, as in FIG. 1, there to be received upon a horizontal, movably mounted panel. The car brakes are then set, or the car is otherwise secured safely on the panel. The elevator is then lifted to the selected floor level. If necessary, it is also caused to travel horizontally to locate the lifted car at the selected port. With the car elevated to align with the desired car port, the turntable on which the car supporting panel is mounted is then actuated to turn the car and panel thereon at a right angle to the building wall, as in FIG. 5, and powered means on the elevator presently described then operates to push the panel endwise thus to convey the car horizontally, rear end first, along a trackway and into the selected storage port. With this transfer movement of the car on a supporting panel, an empty panel is caused to be moved from that port onto the elevator as a replacement for that panel on which the parked car was removed. The arrangement of panels; their coaction and their means for and mode of operation constitutes an important part of the present invention, as will presently be fully explained.

Figure 3:
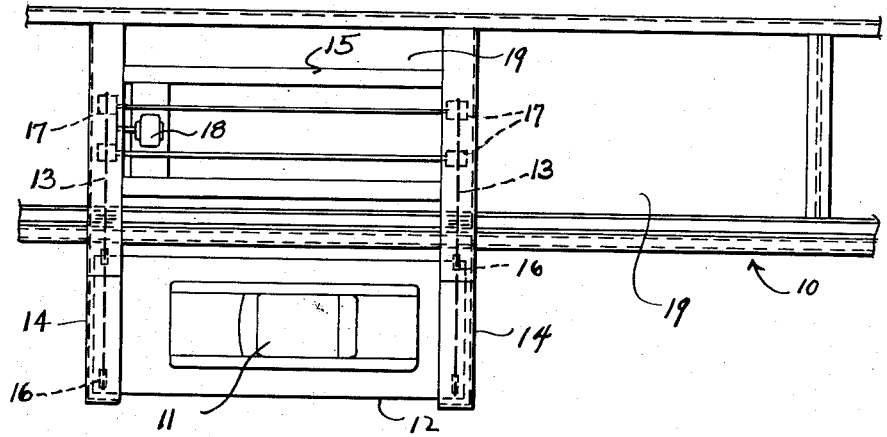
FIG. 3 is a plan, or top view of the parts as shown in FIG. 1.
Figure 7:
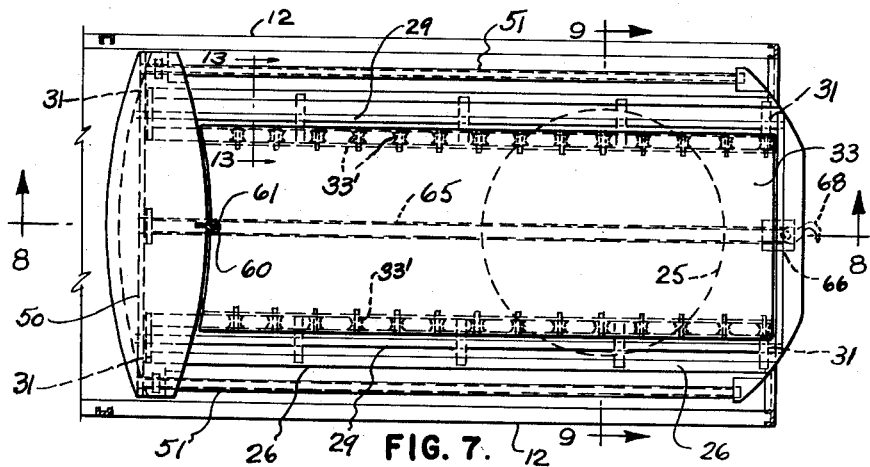
FIG. 7 is an enlarged plan view of the elevator showing the car transfer panel as mounted on the turntable frame and as positioned for reception of an automobile from the street or loading level.
Figure 8:
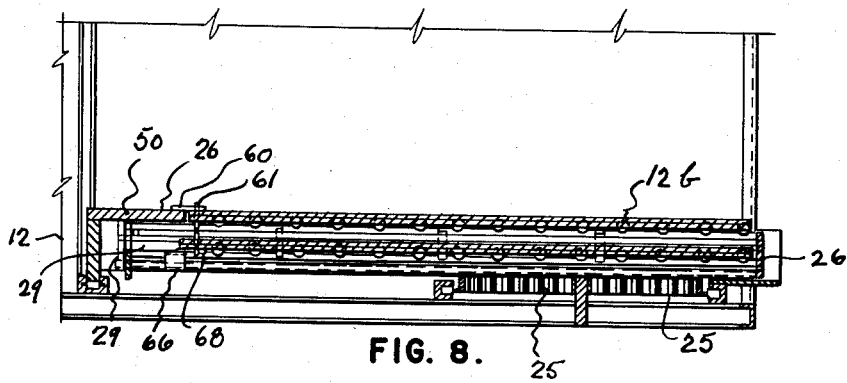
FIG. 8 is a vertical section taken on line 8—8 in FIG. 7 longitudinally of the elevator.
Figure 9:
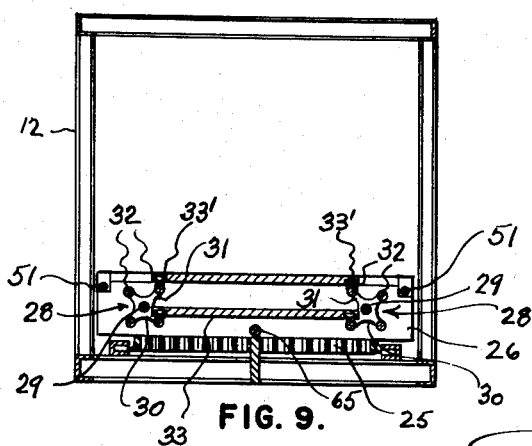
FIG. 9 is a vertical cross-section taken on line 9—9 in FIG. 7.
Figure 10:
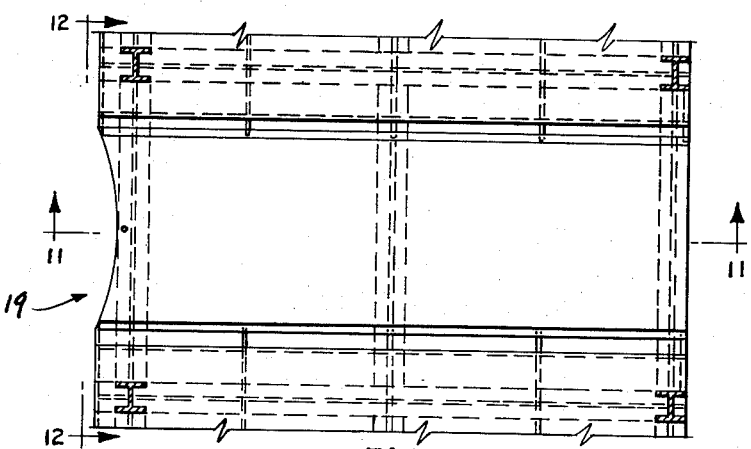
FIG. 10 is a plan view of one of the car ports, showing the lower transfer panel as normally contained therein.
Figure 11:
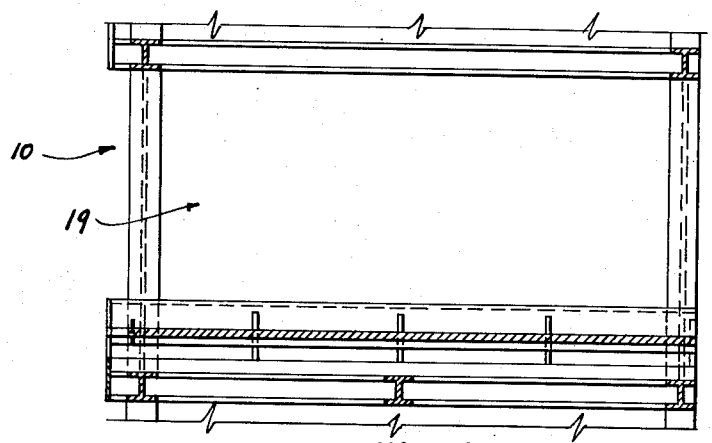
FIG. 11 is a vertical section taken on line 11—11 in FIG. 10.

The elevator 12 comprises a rectangular frame with a horizontal base structure 12b as shown in FIGS. 8 and 9. When in its street level or loading position, the elevator is disposed parallel with the front wall of the storage structure, as shown in FIG. 3. Mounted on this base frame structure is a turntable mounting gear designated in its entirety in FIG. 8 by reference numeral 25. Fixedly mounted on this gear is a horizontal frame structure 26 which mounts therein a pair of panel trackways. It is to be observed, particularly by reference to FIGS. 4, 5, 7 and 8 that the turntable gear 25 is rotatably mounted near the right hand end of the elevator and that the panel supporting frame 26 overhangs this gear to a substantial extent, at the left hand end. The base frame structure 12b mounts laterally spaced and paired track structures 28—28 lengthwise thereof, as shown best in FIGS. 7, 8 and 9. It is shown in FIG. 9 that each track structure comprises a central horizontal shaft 29 that extends the length of the elevator and is rotably supported at its ends by the elevator frame. Fixed on the ends of these shafts are wheels 30, each wheel comprising four equally spaced radial arms 31. Extended between the arms of these wheels as fixed on the opposite ends of the shafts 29 are cylindrical track forming rods 32. It has been shown that the upper and lower track rods which are at the insides of these paired trackways support the car transfer panels 33 thereon; each panel being equipped along its opposite side edges with supporting rollers designed for easy travel on the track rods.

Figure 12:
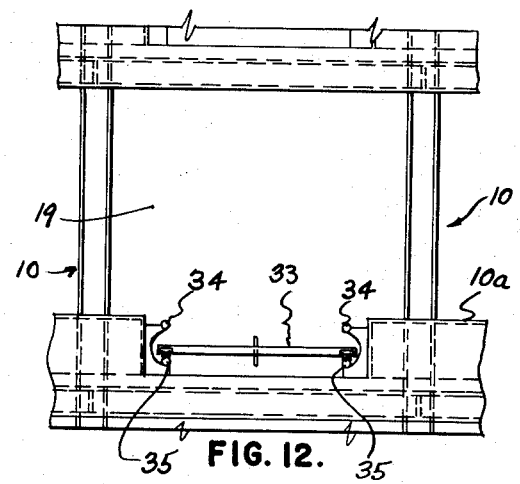
FIG. 12 is a front elevation of the car port as seen through the vertical plane of line 12—12 in FIG. 10.

It is also to be understood by reference to the end view of the car port of FIG. 12, that each port is equipped along opposite sides of its floor structure with fixed upper and lower trackways 34 and 35. These have rods or rails that correspond in spacing to those of the elevator. Thus, when the elevator has been lifted and the panel rotated into position for car transfer, as of FIG. 5, the outer trackways of elevator and those of the car port will be in exact alignment and the car supporting panel on the turntable can be shifted from elevator to port, or vice versa, along the aligned trackways.

Figure 13:
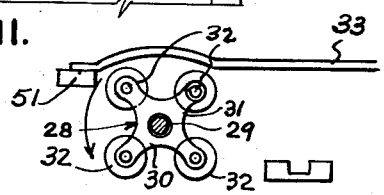
FIG. 13 is an enlarged cross-sectional view of the elevator taken on line 13—13 in FIG. 7.

It is to be understood that the upper set of trackways of the elevator normally supports a panel therein in car loading position when lowered as in FIG. 1. After the car is positioned thereon as in FIG. 2, the elevator is lifted to a desired floor level and is moved into alignment with the designated car port. The turntable then rotates to position the panel for endwise transfer of the car therefrom into the selcted port. It is further to be understood that the car port, at that time mounts a transfer panel 33 on its lower trackways, as in FIG. 12. With the movement of the car mounting panel from the higher trackways of the elevator onto the upper trackways of the car port, the panel 33 in the port is caused to move out onto the lower trackways of the elevator by means presently explained. Then, after the elevator has been returned to loading position, the turntable rotates the panel mounting frame back to parallel relationship with the street. Following this, the track structures therein, designated at 28—28 in FIG. 9, are rotated by their axial shafts 29—29 through 90° as indicated by the arrows in FIG. 13 adjacent thereto and the panel then mounted on the lower set of track rods, is thus lifted to top or upper position ready to receive the next car thereon for parking.

Figure 14:
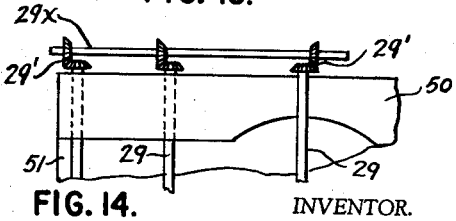
FIG. 14 is fragmental plan view of the forward end portion of the elevator structure.

The rotation of the track structures is effected through gearing 29' located at the forward ends of the shafts 29 and connected thereby as in FIG. 14 with a powered shaft 29x, operated under suitable motor control not herein shown.

The means for movement of the panels 33 between elevator and port comprises a powered unit 50 located at the left hand end of the elevator structure shown in FIGS. 7 and 8.

This unit 50 comprises a transverse cross-head type of pusher plate supporting at its opposite ends by and for travel along paired, threaded shafts 51—51 shown in FIGS. 7, 8 and 9, which extend in parallel relationship horizontally in and along opposite sides of the base frame structure of the turntable. Rotation of these shafts, in unison and in proper direction, causes the unit 50 to push the car mounting panel from elevator to car port.

This unit also serves to withdraw the car mounting panel for returning the car to the elevator. It is shown to be equipped with a horizontally swinging hook 60 that is adapted to be holdingly engaged with a vertical pin 61 at the outer end of every panel.

The outward travel of the unit 50 with hook engaged with a panel pin, returns the car to the turntable for lowering to unloading position or for movement to another port.

Mounted below the panel trackways midway thereof is a threaded shaft 65 (see FIGS. 7, 8, 9) which has a block 66 threaded thereon. This block mounts a swinging hook 68. The threading of the shaft 65 is such and it is so driven that with the inwardly travel of a car mounting panel, this block moves outwardly and causes its hook 68 which has been holdingly engaged with the forward end pin of the car ports empty panel incident to swinging of the car mounting panel to unloading position, to place the replacement panel onto the lower trackways of the turntable structure onto the lower track members 32 of the elevator.

Figure 2:
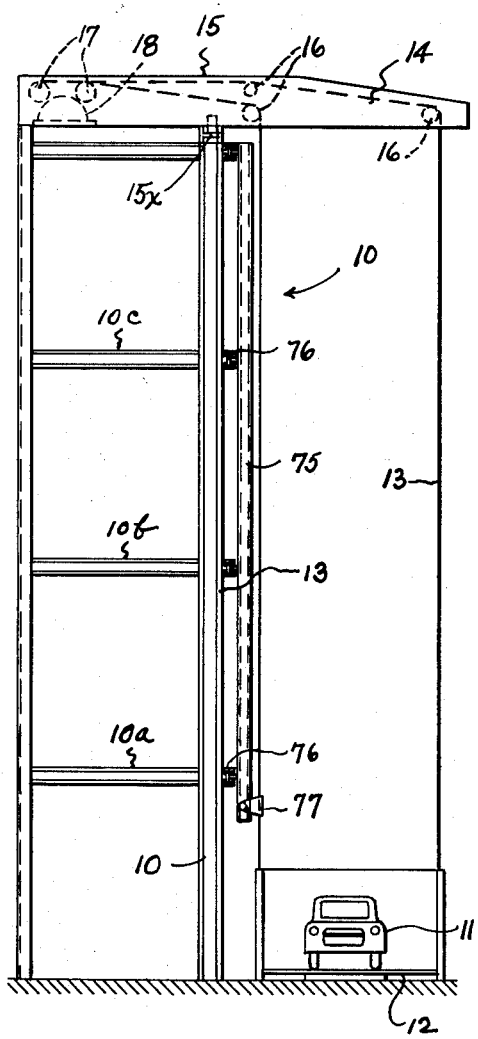
FIG. 2 is a vertical cross-section of the structure taken on line 2—2 in FIG. 1.

To stabilize the movement of the elevator in its vertical or lateral travel, I have provided a pair of vertically depending channel members shown at 75 in FIGS. 1 and 2. These are supported by horizontal trackways 76 at the several floor levels, for travel along the building with the horizontal movement of the elevator. The inside set of cables 13 pass through guide blocks 77 that are fixed for vertical movement in the channels 75 with the up and down travel of the elevator. These blocks are fixed to the cables relatively close to the elevator structure, as observed in FIG. 2, and operate to restrain the elevator against any outward or inward swinging while the beams 75 restrain it against endwise or lateral sway.

The mode of operation of the system, in brief, is as follows: reference being to FIGS. 7, 8 and 9.

Assuming the elevator to be at street level as in FIGS. 1 and 2, the car to be parked is driven onto the panel of the elevator platform. The elevator is then lifted to the designated floor level and shifted horizontally as may be required for alignment with the designated car port. Then the turntable turns the car to the endwise position of FIG. 5.

Figure 5:
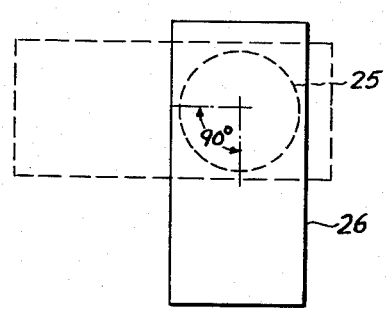
FIGS. 4, 5 and 6 are plan views showing, respectively, the position of an automobile approaching the elevator at street level; the right angle turning of the car supporting turntable of the elevator after being lifted to the selected parking level; and the position of the automobile after being advanced into a selected port or parking space at the selected floor level.
Figure 6:
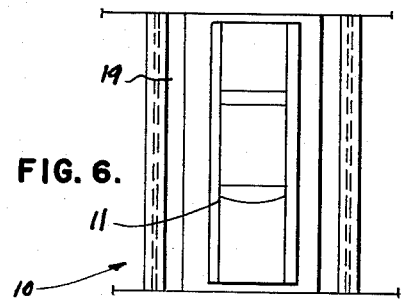
Figure 4:
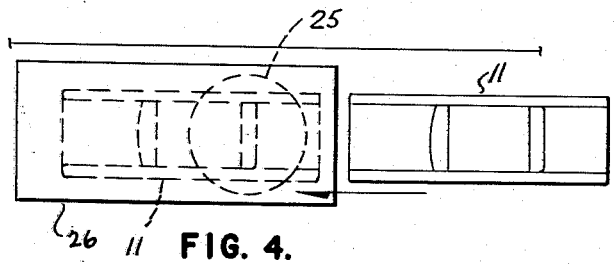

With the swinging of the car mounting panel by the turntable to this endwise position of FIG. 5, the hook 60 on the power unit engages with the pin 61 at the outer end of the panel, and the hook 68 on block 66, which has with the previous outward movement of a car mounting panel, been advanced to the rear end of the turntable platform, will engage the pin of the port contained panel. The power unit 50 then pushes the car mounting panel 33 into the car port, and as this takes place the block 66 travels outwardly and pulls the panel in the port onto the lower trackway of the elevator.

With the car unloading operation completed the turntable rotates to parallel relationship with the building wall and the elevator is lowered to original ground level position. With the elevator in lowered position, the shafts 29 are caused to be rotated through 90° and this operates to lift the panel from a low level to the top level for car reception.

If the car is to be withdrawn from a car port, the operation is substantially the same. The elevator is lifted and moved to alignment with the car containing port and the turntable turns to place the panel endwise of the port as in FIG. 5, then the power unit is used to pull the car mounting panel from the port onto the elevator and the platform rotated back to unloading position, corresponding to the showing of FIG. 1.

What I claim as new is:

1. An automobile storage system comprising, in combination, a storage structure having a plurality of floors at different horizontal levels; each floor providing a succession of car storage ports along the same side of the structure, each port opening at one end to said side, a trackway along the top of said structure, a crane mounted for travel along said trackway, an elevator platform suspended by said crane at said side of the structure and adapted to be lifted thereby from a loading level to any designated floor level, and also to be moved horizontally thereby into car transfer position relative to any selected port, a turntable on the elevator whereby cars received in parallel relation to said side of the building, may be turned at a right angle thereto for their endwise transfer into a car port; said turntable having a frame structure rotatable therewith, upper and lower trackways in the said frame structure, upper and lower trackways in each car port so positioned that the trackways of the elevator may be aligned, therewith a pair of car mounting panels mounted on said aligned trackways for movement in opposite directions between elevator and ports, and power means for moving said power means for moving said panels between turntable and ports comprising threaded shafts associated with each trackway structure, panel moving means attached to the panels, and having threaded connection with said shafts, and means for rotatably driving said shafts to effect their turning for imparting transfer movement of the panels along their trackways between positions on the elevator and in the ports.

2. The combination of claim 1 wherein a power unit is movable along the elevator structure and has threaded connection with said shafts for imparting movement to said unit, and wherein said unit is equipped with a swinging hook mechanism for effecting a holding connection with a panel for its transfer movement.

3. The device of claim 1 wherein a threaded shaft is mounted for rotation and has a hook mounting block mounted for travel along said shaft with its rotation, to move said block opposite to the direction of travel of the car mounting panel, and which block mounts a swinging hook means engageable with a lower panel to transfer it between port and turntable with the movement of the car mounting panel into a port.

References Cited in the file of this patent

UNITED STATES PATENTS

| | | |
|---|---|---|
| 377,266 | Naylor | Jan. 31, 1888 |
| 2,223,962 | Mitchell | Dec. 3, 1940 |
| 2,412,009 | Rickland | Dec. 3, 1946 |
| 2,499,498 | Hammond | Mar. 7, 1950 |
| 2,511,619 | Bowser | June 13, 1950 |
| 2,667,983 | Billings | Feb. 2, 1954 |
| 2,876,913 | Roth et al. | Mar. 10, 1959 |

FOREIGN PATENTS

| | | |
|---|---|---|
| 127,519 | Australia | May 6, 1948 |